United States Patent
Dirstine et al.

(10) Patent No.: US 10,194,284 B2
(45) Date of Patent: Jan. 29, 2019

(54) EMBEDDED COMMUNICATION IN MESSAGE BASED TRANSPORTS

(75) Inventors: Adam D. Dirstine, Rochester, MN (US); Christopher Glen Popp, Winona, MN (US)

(73) Assignee: Digit International Inc., Minnetonka, MN (US)

( * ) Notice: Subject to any disclaimer, the term of this patent is extended or adjusted under 35 U.S.C. 154(b) by 166 days.

(21) Appl. No.: 13/612,404

(22) Filed: Sep. 12, 2012

(65) Prior Publication Data

US 2014/0074946 A1 Mar. 13, 2014

(51) Int. Cl.
*G06F 15/16* (2006.01)
*H04W 4/12* (2009.01)
*H04W 4/70* (2018.01)

(52) U.S. Cl.
CPC .............. *H04W 4/12* (2013.01); *H04W 4/70* (2018.02)

(58) Field of Classification Search
CPC .......... H04W 4/22; H04L 12/66; H04L 47/00; H04L 47/10; H04L 47/50; H04L 51/00; H04L 51/02–51/046; H04L 51/08; H04L 51/10; H04L 51/18; H04L 51/20; H04L 51/30; H04L 51/34; H04B 1/66–1/667; H03M 7/3059–7/3064; H04J 1/08; H04J 3/18; H04M 1/82; H04M 1/573; H04M 3/2281; H04M 7/0012; H04M 7/0024; H04M 7/0039; H04M 11/066; H04M 11/00; H04M 11/06
USPC ........... 370/358; 719/314; 709/206–207, 224
See application file for complete search history.

(56) References Cited

U.S. PATENT DOCUMENTS

| | | | | |
|---|---|---|---|---|
| 5,751,723 A | * | 5/1998 | Vanden Heuvel | H04L 12/56 370/504 |
| 5,915,094 A | * | 6/1999 | Kouloheris | G06F 3/0613 348/E5.008 |
| 6,345,389 B1 | * | 2/2002 | Dureau | 725/116 |
| 6,381,465 B1 | * | 4/2002 | Chern et al. | 455/466 |
| 6,493,342 B1 | * | 12/2002 | Breslow et al. | 370/394 |
| 6,501,760 B1 | * | 12/2002 | Ohba et al. | 370/395.42 |
| 6,760,309 B1 | * | 7/2004 | Rochberger | H04L 29/06027 370/229 |
| 7,058,036 B1 | * | 6/2006 | Yu et al. | 370/335 |

(Continued)

OTHER PUBLICATIONS

Using SMS for M2M Data—Best Practices; The Z Spot; Mar. 30, 2012.*
ETSI—GSM 03.40 Version 5.3.0—Jul. 1996.*

*Primary Examiner* — Tauqir Hussain
(74) *Attorney, Agent, or Firm* — Fogg & Powers LLC

(57) ABSTRACT

Systems and methods for utilizing unused space in expensive message based communication to embed messages from a sender device to a receiver device to maximize payload usage over a potentially fee-based messaging service. One or more machine-to-machine messages may be embedded in unutilized transport space when other communications, that may potentially be delivered over a fee-based network, are initiated at a device. The machine-to-machine message and other communications may be extracted from a combined message package at a receiving device and processed as if they were independently transported. Machine-to-machine messages may be segmented and embedded across multiple unrelated communication packages and later reassembled.

18 Claims, 5 Drawing Sheets

(56) References Cited

U.S. PATENT DOCUMENTS

| | | | |
|---|---|---|---|
| 7,103,348 B1* | 9/2006 | Levit | H04M 1/27455 455/412.1 |
| 7,257,664 B2* | 8/2007 | Zhang | 714/748 |
| 7,912,486 B2* | 3/2011 | Bantukul et al. | 455/466 |
| 8,549,135 B1* | 10/2013 | Yazdani | 709/224 |
| 8,886,166 B2* | 11/2014 | Fratti | H04W 12/10 455/41.2 |
| 8,995,460 B1* | 3/2015 | Ashraf et al. | 370/429 |
| 2002/0019853 A1* | 2/2002 | Vange et al. | 709/207 |
| 2004/0229635 A1* | 11/2004 | Hertz | 455/466 |
| 2006/0140181 A1* | 6/2006 | Trumper | H04L 12/4633 370/389 |
| 2006/0183489 A1* | 8/2006 | Modeo | 455/466 |
| 2006/0288423 A1* | 12/2006 | Le | H04L 63/0428 726/26 |
| 2007/0112962 A1 | 5/2007 | Lewontin | |
| 2007/0129015 A1* | 6/2007 | Iwamoto et al. | 455/41.2 |
| 2007/0155489 A1* | 7/2007 | Beckley et al. | 463/29 |
| 2007/0189219 A1* | 8/2007 | Navali | H04L 29/12339 370/331 |
| 2008/0054072 A1* | 3/2008 | Katragadda et al. | 235/384 |
| 2008/0130557 A1* | 6/2008 | Kuchibhotla et al. | 370/329 |
| 2009/0047929 A1* | 2/2009 | Chesnutt | H04L 12/5895 455/411 |
| 2009/0163231 A1* | 6/2009 | Yoo | H04L 12/5895 455/466 |
| 2009/0170525 A1* | 7/2009 | Baghdasaryan | G01S 5/0072 455/456.1 |
| 2009/0233613 A1* | 9/2009 | Furuta | 455/450 |
| 2010/0202368 A1* | 8/2010 | Hans | 370/329 |
| 2011/0151924 A1* | 6/2011 | Miller | 455/552.1 |
| 2011/0289428 A1* | 11/2011 | Yuen et al. | 715/752 |
| 2012/0208492 A1* | 8/2012 | Tschofenig | H04M 3/5116 455/404.2 |
| 2013/0254314 A1* | 9/2013 | Chow | 709/206 |
| 2013/0336223 A1* | 12/2013 | Huang et al. | 370/328 |
| 2014/0379568 A1* | 12/2014 | Kusakabe | G06Q 20/06 705/39 |

* cited by examiner

EMBEDDED COMMUNICATION IN MESSAGE BASED TRANSPORTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2012, Digi International Inc. All Rights Reserved.

BACKGROUND

Sending machine-to-machine (M2M) messages between M2M servers and mobile or embedded devices over commercially available short message service (SMS) protocols and other message based transports can be expensive. Sending status and other infrastructure information between the device and the server is desirable, but because each message may incur a cost to the device's owner or user excessive M2M communication can be undesirable.

Each SMS message sent or received can be very expensive. The use of SMS can cost a user as much as $0.25 per message over cellular networks in the United States, and much more outside the U.S., to send an SMS message. Alternative message based protocols, such as the ORBCOMM® satellite M2M network, can be even more expensive for each message. Because the cost for messaging services over SMS for a device is typically negotiated and incurred by the customer, it makes it nearly impossible for device or application developers to make intelligent cost decisions automatically in the device software because the device or application developers providing the M2M service may not be aware of the cost per message.

OVERVIEW

The present inventors have recognized, among other things, that a problem to be solved can include how to send status or infrastructure information between devices for little or no cost. The present subject matter can help provide a solution to this problem, such as by utilizing unused space in potentially expensive message based communication to embed messages from a sender to a receiver allowing for effectively free messaging on what would otherwise be a costly messaging service.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
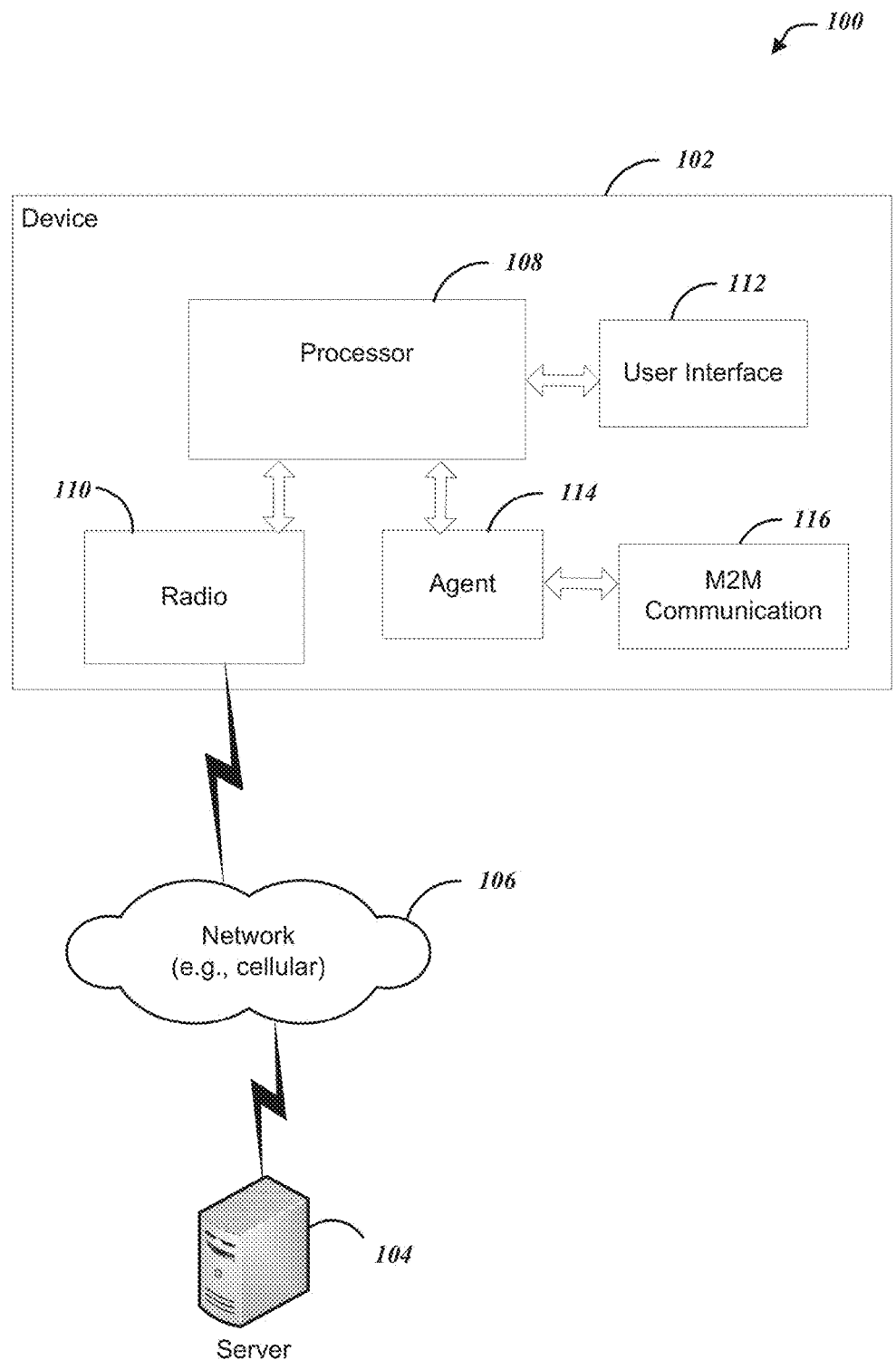
FIG. 1 illustrates a block diagram of a wireless device and a server in communication over a network, in accordance with some embodiments.

FIG. 1 illustrates a block diagram 100 of a device 102 and a server 104 in communication over a network 106. Device 102 may include a processor 108, and radio 110 for communication with the network 106. Device 102 may include a user interface 112 that allows a user to manipulate the device 102 or to input information to be communicated to server 104, or one or more data sensors that may acquire data from an environment proximate to device 102. Device 102 may include an agent module 114 configured to initiate or receive machine-to-machine (M2M) communication 116 between the device 102 and the server 104. M2M communication 116 may include sensor readings, device status messages, device commands, or any of a variety of other communication data. Examples of device 102 may include smart phones, personal digital assistants, personal computers, networked appliances, Xbee® wireless modules, or any other machine or device capable of communicating over a wired or wireless network.

Examples of server 104 may include any wired or wireless device coupled to network 106. For example, a server 104 may include a personal computer, a smart phone, a personal digital assistant, a cloud-based computing or monitoring service, or any other network capable device.

The network 106 may include any of a variety or combination of wired or wireless networks such as mobile, cellular, satellite, Internet, intranet, or other communication networks. Communications between a client 102 and a server 104 over a network 106 may include directly sending a message, and explicitly incurring a cost for the communication when a fee-based data service is used. For example, a M2M messaging between a client 102 and a server 104 over a commercially available short message service (SMS) may incur transaction costs on a per message basis.

An alternative to per-message SMS costs is for device 102 to attempt to communicate with the server 104 using a subscription data service to exchange messages. For example, cellular carriers that offer networks may provide mobile data services, which are available from a variety of service providers with various levels of cost and service. However, the cost of a data service connection may require a monthly subscription fee, and data service coverage may not be available in all geographic locations.

In the example embodiment shown in FIG. 1, device 102 may embed messages containing commands, data, system status, or other information in unused portions of standard messaging structures. The server 104 may receive, via network 106, messages, which may include embedded message content, and extract the embedded message content from the message structures.

Figure 2A:
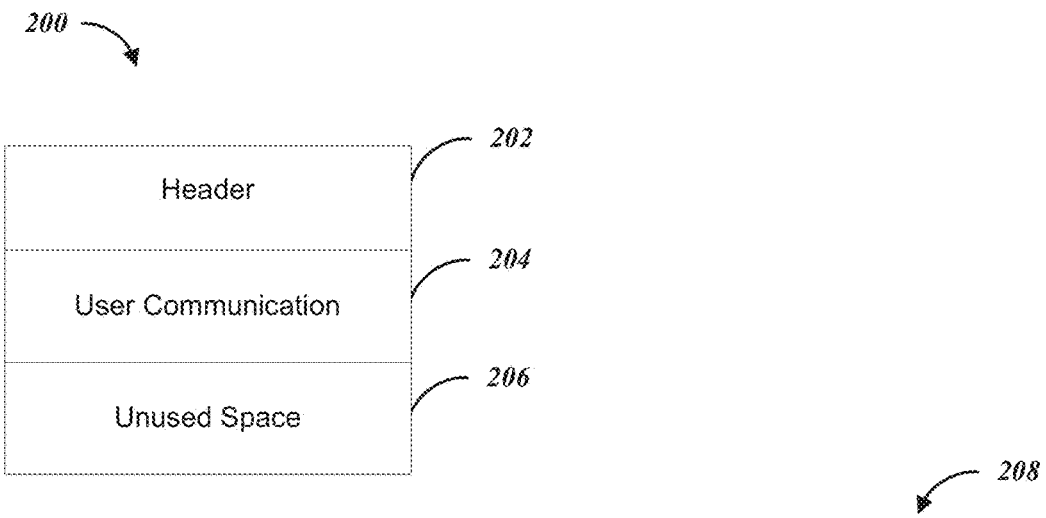
FIGS. 2A, 2B and 2C illustrate example message structures, in accordance with some embodiments.

FIG. 2A illustrates an example message structure 200 that may be used to communicate between devices, between one or more devices and a server, or any combination of networked devices, machines, clients or servers that are coupled to a network. Message structure 200 includes a header 202 that may include protocol identifiers, data coding scheme information, time stamp data, origin and destination information, and any other information appropriate to send, route, and receive a message for a particular protocol. Message structure 200 also includes a user communication payload 204, such as a string of text characters encoded in a 7-bit alphabet. A portion of the user communication payload 204 may also include unused space 206 that is often empty when the user communication payload 204 portion of a message is not fully utilized.

In an example, the unused space 206 exists when users send messages to and from either a server or wireless device. Typically, users send messages to or from the device or server as user messages (a binary, arbitrary length message that is exchanged between the server and the device) or as commands from the server to the device that are smaller than the maximum available capacity of message structure 200.

User messages generally leave unused space 206 in the transport level message (e.g., user communication 204). For example, a user may wish to send a reboot command from a server to a device. The reboot command may be communicated in a message that is six-bytes long in an example short message protocol. If the reboot message is sent over an SMS service that has a theoretical maximum message length of one-hundred-forty bytes then one-hundred-thirty-four bytes would remain as unused payload space.

Figure 2B:
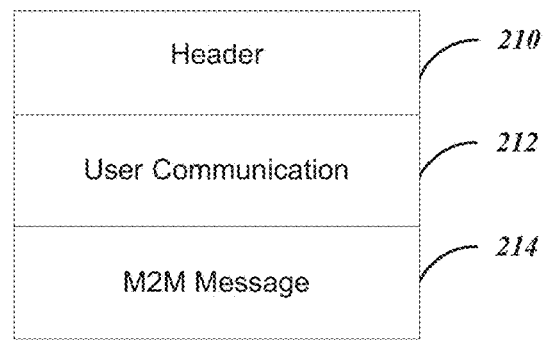

FIG. 2B illustrates an example message 208 that includes a header 210, user communication payload 212, and an embedded M2M message 214. The embedded M2M message 214 utilizes the payload space available to the user communication payload 212 that is unused.

Figure 2C:
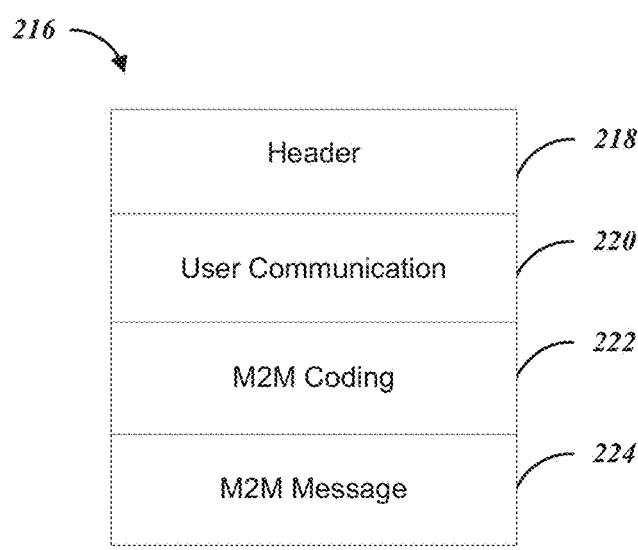

FIG. 2C illustrates an an example message 216 that includes a header 218, user communication 220, M2M coding 222, and an embedded M2M message 214. The M2M coding 222, and the embedded M2M message 214 utilize the payload space available to the user communication 220 that is unused. The M2M coding 222 may include M2M information such as a message identifier, a multi-part message indicator, M2M message size information, or other protocol specific data to facilitate the M2M communication.

In an example, the user communication 220 and the M2M message 214 may be combined into a combined payload package for transmission from a device or server. The M2M coding 222 may be included in the payload package, or be included as a separate header or footer to provide an indication to a receiving device as to the nature of the payload package.

In an example, agent module 114 is included in the wireless device 102 and in the server 104 may compress the M2M messages, the user communication, or both. In this manner, even if a user attempts to send a message that should utilize all or nearly all of the available message length, additional free space may be utilized after compressing the message, user data, or both. The compression may be performed by an encoding component that is under the control of a M2M module (e.g., agent 114) on the server side or on the device side. A user or application interacting with the M2M module or communication infrastructure need not be aware that compression is being performed.

In the example, server 104 may embed messages containing commands, user initiated requests, system status, or other data or information, in unused portions of standard messaging structures as detailed in FIG. 2A-2C above. The device 102 may receive, over network 106, messages that may include embedded message content, and extract the embedded message content from the messages.

Figure 3:
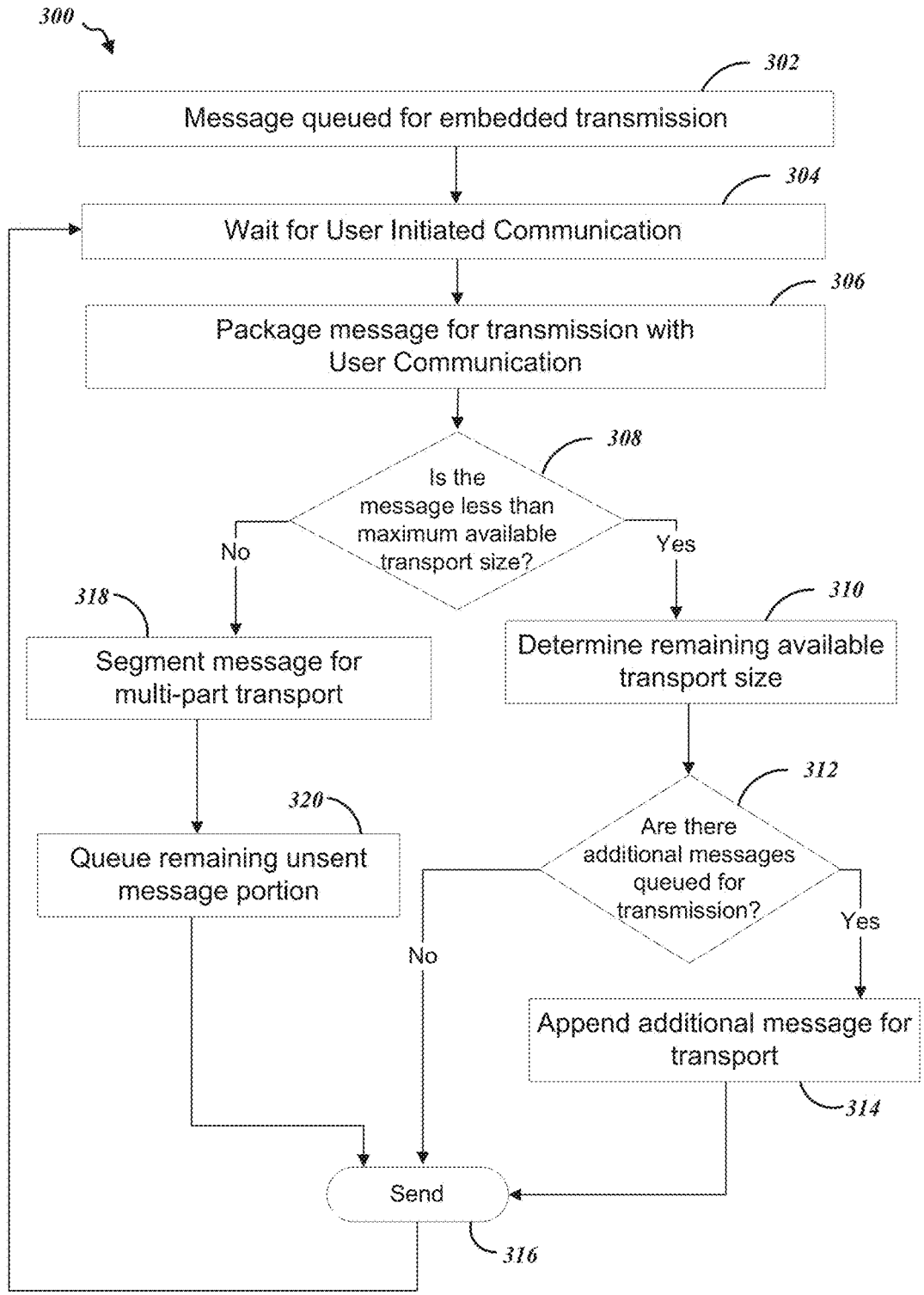
FIG. 3 illustrates a flow diagram of an example scheme for embedding messages with user communications, in accordance with some embodiments.

FIG. 3 illustrates a flow diagram of an example scheme 300 for embedding messages with user communications. At 302, messages that are eligible to be sent as M2M communication are queued at a server or device. The type of messages may be independent of the server or device messaging protocols. For example, messages may include status messages, error indicators, pending message indicators, or any other arbitrary message that may be communicated between multiple devices, or a server and a device.

At 304, queued messages wait in a queue until a user initiates a message from the server or device where the message is queued. For example, a user may enter a command or communication via a web service or interactively via a user interface on the server side, or directly through a user interface the device. When the user initiates a message, at 306, an agent wraps the message in a message protocol to prepare it for transmission. In another example, a program running on the device may wakes up out of a sleep state periodically, e.g., once every eight hours, acquire a sensor reading, and queue the acquired reading for delivery to a server.

If, at 308, the message is less than the maximum transport message length, then, at 310, the device or server may determine available remaining transport size. At 312, a server or device may check if there are additional messages queued for transmission, and if messages remain in the queue, then at 314, attempt to add the next pending message to the transport message. The additional message can be appended to the existing request in the protocol by either adding it to the end of the previous message when using fixed length requests, or alternatively, a specific multi-message indicator can be utilized to indicate that multiple messages are included in the overall message. If, at 312, there are no pending messages to include, or the message payload is fully utilized, then, at 316, the message can be sent.

If, at 308, the queued message is larger than the available transport size then at 318 the queued message may be segmented for transmission as a multi-part message. Segmenting may result in one or more messages that may fill the available transport size, and zero or one message that may be smaller than the available transport. At 320, the remaining unsent message portion(s) that exceeded the available transport size may be queued for later transport, or included with another message that is smaller than the available transport. In an example, the unset message portion may be inserted at the head of the message queue in order to maintain a proper message sequence. At 316, the message can be sent when the available transport size is filled. After a message is sent, queued messages wait in a queue, at 304, until a user initiates another message from the server or device where the message is queued.

In an example, when multiple messages are pending in a queue, messages may be selected from the queue based on their size as opposed to their position in the queue. For example a shorter message that is pending in the queue may be added to any unutilized space in a message package before a large message that would require multiple message packages to communication. In an example where it is necessary or useful for the ordering of messages should be maintained, the encoding of messages may include adding ordering information, e.g., a sequence number, which indicates to a receiving device how the received messages should be ordered after they are received. In this manner messages may be transmitted out of order at the transport layer in order to maximize the use of available unused data space, while allowing the messages to be properly reordered upon receipt by a receiving device.

Figure 4:
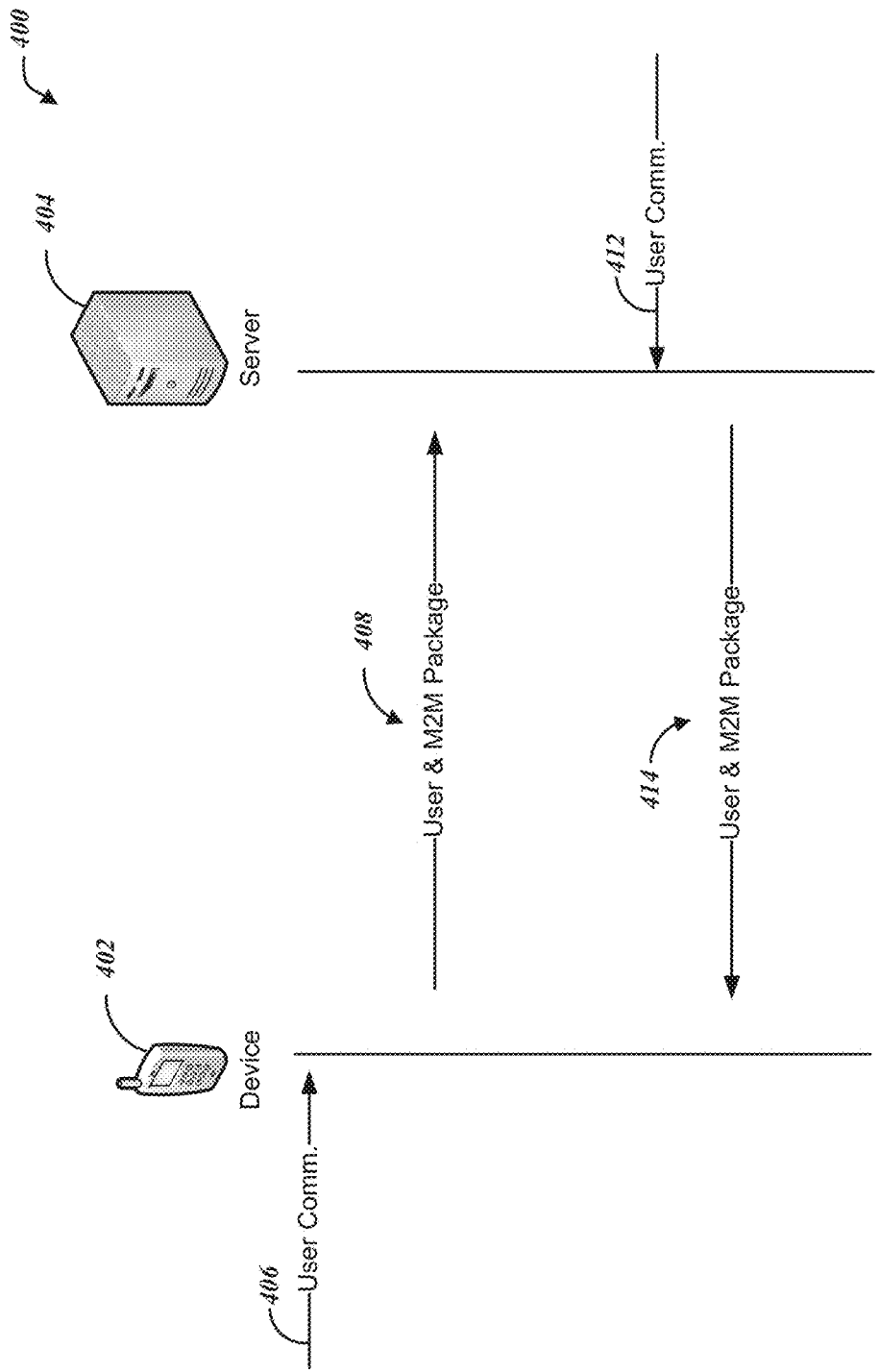
FIG. 4 illustrates an example interaction diagram of a device and a server, in accordance with some embodiments.

FIG. 4 illustrates an example interaction diagram 400 of a device 402 and a server 404. In the depicted example, a user initiates communication 406 at the device 402. Alternatively, communications may also originate from the server 404. Upon receipt of user communication 406 the device 402 may encode a M2M communication message that is queued in the device 402 in any unused portion of a message payload space, along with the user communication 406. In some such approaches, communications from server 404 to device 402 are used to transmit M2M messages as well.

Both the user communication 406 and the M2M communication are then sent as a package 408 from the device 402 to the server 404. The receiving server 404 may process and separate the user communication and the M2M message to provide for handling of the separate communications as if they were sent separately.

A second user communication 412 may originate at the server 404 either in response to the original user communication 406 or as an independent event. The server 404 may similarly package any pending M2M communication queued at the server for transmission to device 402, along with the second user communication 412 for transmission as a second package 414. The receiving device 402 may process and separate the user communication and the M2M message to handle the user and M2M communications as if they were sent separately.

In an example, a user may wish to check a setting on a thermostat in the user's home that is equipped to communicate wirelessly with the user's smart phone. The user may access an application or agent on the user's smart phone to send a SMS status request message to the thermostat via a cellular network. In this example the user's smart phone is acting as a server to query a device, the user's thermostat. In addition to the user initiate status request, the application on the user's smart phone may also wish to acquire software version information from the user's thermostat. In response to the user's initiation of the thermostat status request the application may combine the user's status request with the application's software version information request. Both messages may be combined into a single SMS message and wirelessly delivered to the thermostat.

Upon receipt of the single SMS message from the user's smart phone, the thermostat may separate the user's status request and the application's software version information request for separate processing. The thermostat may place its software version information in a M2M queue for later delivery. In response to the user's status request the thermostat may prepare a SMS reply for delivery to the user's smart phone. If the SMS reply is smaller than the maximum available SMS payload the software version information in the M2M queue may also be included with the SMS reply. If the SMS reply utilizes all of the maximum available SMS payload the software version information may remain in the M2M queue until space is available in a subsequent message.

In an example, a thermostat in the user's home may be configured to periodically transmit a message that may include a sensed temperature measurement to a cloud-based server. The thermostat may communicate with the server through a wired or wireless network, in the manner described herein, or though an alternative communication mechanism. A user may utilize a smart phone, terminal, personal computer, tablet computer, or other device to communicate with the cloud-based server to obtain information provided to the server by the thermostat or other sensor. The thermostat in these examples is provided as an illustration and not as a limitation. For example, other devices or sensors may be substituted for the thermostat, and similarly configured to communicate with a user's smart phone, a server, or any other device.

Figure 5:
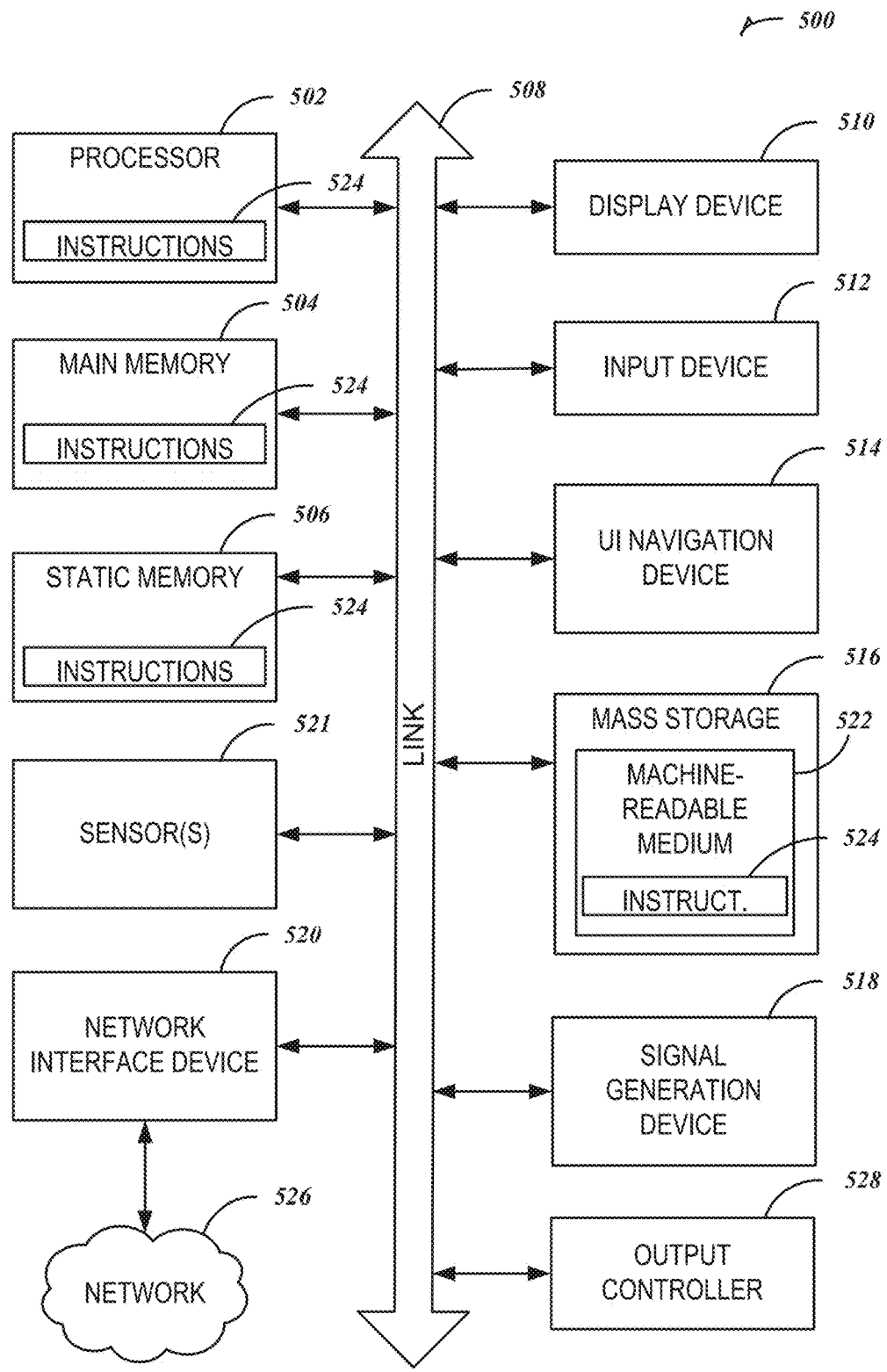
FIG. 5 illustrates a block diagram of an example machine upon which any one or more of the techniques discussed herein may be performed.

FIG. 5 illustrates a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a Personal Digital Assistant (PDA), a mobile telephone, a web appliance, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a processing unit, a graphics processing unit (GPU), a hardware processor core, or any combination thereof), a main memory 504, and a static memory 506, some or all of which may communicate with each other via a link 508 (e.g., a bus, link, interconnect, or the like). The machine 500 may further include a display device 510, an input device 512 (e.g., a keyboard), and a user interface (UI) navigation device 514 (e.g., a mouse). In an example, the display device 510, input device 512, and UI navigation device 514 may be a touch screen display. The machine 500 may additionally include a mass storage (e.g., drive unit) 516, a signal generation device 518 (e.g., a speaker), a network interface device 520, and one or more sensors 521, such as a global positioning system (GPS) sensor, camera, video recorder, compass, accelerometer, or other sensor. The machine 500 may include an output controller 528, such as a serial (e.g., universal serial bus (USB), parallel, or other wired or wireless (e.g., infrared (IR)) connection to communicate or control one or more peripheral devices (e.g., a printer, card reader, etc.).

The mass storage 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage 516 may constitute machine readable media.

While the machine-readable medium 522 is illustrated as a single medium, the term "machine readable medium" may include a single medium or multiple media (e.g., a centralized or distributed database, and/or associated caches and servers) that configured to store the one or more instructions 524.

The term "machine-readable medium" may include any tangible medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for embedded communication between devices comprising:
    queuing a machine-to-machine message in a queue at a first device;
    receiving, at the first device, a user-initiated command to transmit a communication message to a second device, wherein the communication message is structured according to a particular device messaging protocol, wherein the device messaging protocol defines a procedure to create a message packet of a specific structure or format;
    determining an available first payload within the communication message for the machine-to-machine message, wherein the available first payload has a size that is a function of the communication message's size;
    rendering the machine-to-machine message distinguishable from the communication message by the second device by structuring the machine-to-machine message independently of the particular device messaging protocol;
    loading a first portion of the distinguishable machine-to-machine message into the available first payload of the communication message to form a package;
    queuing a second portion of the distinguishable machine-to-machine message at a first position in the queue; and
    transmitting the package to the second device wherein the distinguishable machine-to-machine message includes a second payload that includes at least one of:
        information about a device, the information having been captured without user intervention; and
        information about an action to be, or that has been, performed by a device, the information having been captured without user intervention.

2. The method of claim 1, wherein the queue includes a plurality of machine-to-machine messages, and wherein loading includes selecting one of the plurality of machine-to-machine messages from the queue.

3. The method of claim 2, wherein selecting one of the plurality of machine-to-machine messages from the queue includes comparing a machine-to-machine message size to the available payload.

4. The method of claim 1, comprising: compressing the machine-to-machine message.

5. The method of claim 4, comprising: compressing the communication message prior to determining the available payload.

6. The method of claim 1, wherein loading the first portion of the machine-to-machine message into the available first payload includes dividing the machine-to-machine message into the first portion and the second portion, and embedding the first portion in the available first payload.

7. The method of claim 1, wherein the first device is a client device, and the second device is a server.

8. The method of claim 1, wherein the first device is a server, and the second device is a client device.

9. An embedded communication system comprising:
    a first device coupled to a network;
    a second device coupled to the network, wherein one of the first and second devices is configured to communicate with the other device over the network by embedding messages in a communication;
    wherein the embedding includes:
        queuing a machine-to-machine message in a queue;
        receiving a command to transmit a communication message to the other device, wherein the communication message is structured according to a particular device messaging protocol, wherein the device messaging protocol defines a procedure to create a message packet of a specific structure or format;
        determining an available first payload within the communication message, wherein the available first payload is a function of a size of the communication message;
        encoding the machine-to-machine message to be distinguishable from the communication message by the other device at least by structuring the machine-to-machine message independently of the particular device messaging protocol;
        loading a first portion of the distinguishable machine-to-machine message into the available first payload to form a package;
        queuing a second portion of the distinguishable machine-to-machine message at a first position in the queue; and
        transmitting the package to the other device;
    wherein the machine-to-machine message comprises a second payload that includes at least one of:
        information about a device, the information having been captured without user intervention; and
        information about an action to be, or that has been, performed by a device, the information having been captured without user intervention.

10. The system of claim 9, wherein the embedding includes: selecting one of the plurality of machine-to-machine messages from the queue based on a determined size of the available first payload.

11. The system of claim 10, wherein the embedding includes: compressing the machine-to-machine message.

12. The system of claim 11, wherein the embedding includes: compressing the communication message prior to determining the available first payload.

13. The system of claim 10, wherein loading the machine-to-machine message into the available first payload includes dividing the machine-to-machine message into the first portion and the second portion.

14. A tangible computer readable non-transitory medium comprising a plurality of instructions that in response to being executed on a computing device, cause the computing device to:
 queue a machine-to-machine message in a queue at a first device;
 receive a user-initiated command at the first device to transmit a communication message to a second device, wherein the communication message is structured according to a particular device messaging protocol that defines a procedure to create a message packet of a specific structure or format;
 determine an available first payload within the communication message for the machine-to-machine message, wherein the available first payload has a size that is a function of the communication message's size;
 render the machine-to-machine message distinguishable from the communication message by the second device by creating the machine-to-machine message independently of the procedure defined by the particular device messaging protocol;
 load a first portion of the machine-to-machine message into the available first payload to form a package;
 queue a second portion of the machine-to-machine message at a first position of the queue; and
 transmit the package to the second device;
 wherein the machine-to-machine message comprises a second payload that includes at least one of:
  information about a device, the information having been captured without user intervention; and
  information about an action to be, or that has been, performed by a device, the information having been captured without user intervention.

15. The tangible computer readable non-transitory medium of claim 14, wherein the plurality of instructions comprise: selecting one of a plurality of machine-to-machine messages from the queue based on a determined size of the available first payload.

16. The tangible computer readable non-transitory medium of claim 14, wherein the plurality of instructions comprise:
 compressing the machine-to-machine message.

17. The tangible computer readable non-transitory medium of claim 16, wherein the plurality of instructions comprise:
 compressing the communication message prior to determining the available first payload.

18. The tangible computer readable non-transitory medium of claim 14, wherein loading the first portion of the machine-to-machine message into the available first payload includes dividing the machine-to-machine message into the first portion and the second portion, and embedding the first portion in the available first payload.

* * * * *